(12) United States Patent
John

(10) Patent No.: US 12,491,331 B2
(45) Date of Patent: Dec. 9, 2025

(54) DUAL-PRESSURE RESPIRATORY ASSISTANCE DEVICE

(71) Applicant: Stephen John, Portage, MI (US)

(72) Inventor: Stephen John, Portage, MI (US)

( * ) Notice: Subject to any disclaimer, the term of this patent is extended or adjusted under 35 U.S.C. 154(b) by 891 days.

(21) Appl. No.: 17/731,320

(22) Filed: Apr. 28, 2022

(65) Prior Publication Data

US 2022/0347414 A1     Nov. 3, 2022

Related U.S. Application Data

(60) Provisional application No. 63/181,990, filed on Apr. 30, 2021.

(51) Int. Cl.
*A61M 16/20* (2006.01)
*A61M 16/00* (2006.01)
(Continued)

(52) U.S. Cl.
CPC ...... *A61M 16/201* (2014.02); *A61M 16/0057* (2013.01); *A61M 16/14* (2013.01);
(Continued)

(58) Field of Classification Search
CPC .............. A61M 16/00; A61M 16/0006; A61M 16/0057; A61M 16/0087; A61M 16/0883;
(Continued)

(56) References Cited

U.S. PATENT DOCUMENTS 10,688,273 B2   6/2020   Gustafson et al.
2004/0050386 A1   3/2004   Levine
(Continued)

FOREIGN PATENT DOCUMENTS

CN   102438571   5/2012
CN   202822380   3/2013
(Continued)

OTHER PUBLICATIONS

John SC, John AV, Moss AW, Gustafson PA, Fernando-Silva L, John SP. Bench Testing of a Bubble Noninvasive Ventilation Device in an Infant Lung Simulator. Respir Care. Sep. 2020;65(9):1339-1345. doi: 10.4187/respcare.07346. Epub Mar. 24, 2020.*

(Continued)

*Primary Examiner* — Joseph D. Boecker
(74) *Attorney, Agent, or Firm* — Gardner, Linn, Burkhart & Ondersma LLP

(57) ABSTRACT

A respiratory delivery system providing a bi-level pressure airflow. The system includes respiratory and pneumatic circuits. The respiratory circuit includes a respiratory gas supply, a patient interface, and a bi-level pressure regulator. The respiratory gas supply supplies a respiratory gas to the patient interface via a first conduit. The bi-level pressure regulator is coupled to the patient interface via a second conduit and is configured to cyclically alternate the respiratory gas passing through the bi-level pressure regulator between a low-pressure level and a high-pressure level. The pneumatic circuit includes a pneumatic gas supply and a pneumatic cycler configured to output a cycling pressure level. The cycler is coupled to the bi-level pressure regulator via a third conduit. The bi-level pressure regulator cyclically alternates the pressure level of the respiratory gas between the low-pressure level and the high-pressure level with the timing defined by the cycling of the pneumatic gas.

18 Claims, 6 Drawing Sheets

(51) Int. Cl.
*A61M 16/06* (2006.01)
*A61M 16/08* (2006.01)
*A61M 16/10* (2006.01)
*A61M 16/14* (2006.01)
*A61M 16/16* (2006.01)

(52) U.S. Cl.
CPC ........ *A61M 16/206* (2014.02); *A61M 16/209* (2014.02); *A61M 2016/0027* (2013.01); *A61M 2016/0039* (2013.01); *A61M 16/06* (2013.01); *A61M 16/0883* (2014.02); *A61M 16/1005* (2014.02); *A61M 2016/1025* (2013.01); *A61M 16/1075* (2013.01); *A61M 16/16* (2013.01); *A61M 2205/3334* (2013.01); *A61M 2205/3348* (2013.01)

(58) Field of Classification Search
CPC ............ A61M 16/1005; A61M 16/122; A61M 16/14; A61M 16/16; A61M 16/201; A61M 16/206; A61M 16/209; A63B 23/18
See application file for complete search history.

(56) References Cited

U.S. PATENT DOCUMENTS

| | | |
|---|---|---|
| 2005/0072470 A1 | 4/2005 | Jacobs et al. |
| 2008/0149099 A1 | 6/2008 | Doyle |
| 2009/0194108 A1* | 8/2009 | Newman, Jr. ..... A61M 16/0666 128/204.18 |
| 2011/0079222 A1 | 4/2011 | DiBlasi et al. |
| 2012/0024286 A1 | 2/2012 | Boring |
| 2012/0160242 A1* | 6/2012 | Gutierrez Fonseca ...................... A61M 16/021 128/203.26 |
| 2012/0204790 A1 | 8/2012 | Chaffee |
| 2012/0220817 A1* | 8/2012 | Castillon Levano ...................... A61M 16/0627 600/22 |
| 2012/0285454 A1 | 11/2012 | Nibu et al. |
| 2013/0269693 A1 | 10/2013 | Neatrour et al. |
| 2014/0166012 A1 | 6/2014 | Steg et al. |
| 2014/0166013 A1 | 6/2014 | Stenzler et al. |
| 2016/0129212 A1 | 5/2016 | Dimatteo et al. |
| 2016/0310689 A1 | 10/2016 | Osborne et al. |
| 2017/0095629 A1 | 4/2017 | Bartlett, II et al. |
| 2017/0281051 A1 | 10/2017 | Evans et al. |
| 2017/0312475 A1* | 11/2017 | Gustafson ........... A61M 16/201 |

FOREIGN PATENT DOCUMENTS

| | | |
|---|---|---|
| WO | 2006004439 | 1/2006 |
| WO | 2012020387 | 2/2012 |
| WO | 2014026227 | 2/2014 |
| WO | WO-2019193535 A1 * | 10/2019 ......... A61M 16/0003 |

OTHER PUBLICATIONS

International Search Report of corresponding PCT Application No. PCT/IB2019/052768, dated Aug. 22, 2019.

* cited by examiner

DUAL-PRESSURE RESPIRATORY ASSISTANCE DEVICE

CROSS REFERENCE TO RELATED APPLICATIONS

The present invention claims the filing benefits of U.S. provisional application, Ser. No. 63/181,990, filed Apr. 30, 2021, which is hereby incorporated by reference herein in its entirety.

FIELD OF THE INVENTION

The present invention is directed to respiratory assistance devices, and in particular, to pneumatic time-cycled, pressure-regulated respiratory assistance devices.

BACKGROUND OF THE INVENTION

Respiratory distress is a significant cause of morbidity and mortality worldwide. Non-invasive treatments, such as Non-Invasive Positive Pressure Ventilation (NIPPV) or bi-level Positive Airway Pressure (BPAP) are widely used to help patients in respiratory distress. The low level of pressure, or "P low" or Positive End Expiratory Pressure (PEEP), functions to recruit and stabilize alveoli, the functional units of the lungs. This can improve oxygenation. The high level of pressure, or "P high" or Peak Inspiratory Pressure (PIP), can help with gas exchange, clearing carbon dioxide. This bi-level pressure support can be particularly helpful to decrease the patient's work of breathing. With NIPPV or BPAP, the clinician can independently set the high level of pressure, the low level of pressure, and the cycling rate.

NIPPV and BPAP (or similar bi-level positive airway pressure systems) have been effectively used to treat infants in respiratory distress due to conditions such as transient tachypnea of the newborn, respiratory distress syndrome, meconium aspiration syndrome, and pneumonia. NIPPV and BPAP have also been used to treat adults with asthma, sleep apnea, or exacerbations in Chronic Obstructive Pulmonary Disease and Congestive Heart Failure, among other conditions.

However, NIPPV/BPAP (hereafter referred to as NIPPV for brevity) is presently delivered with complex ventilators or BPAP machines, which can be expensive, are difficulty to use, and require continuous electricity to operate. These requirements are a barrier to implementation in many resource-limited settings. Such requirements often leave much of the world without access to this treatment.

SUMMARY OF THE INVENTION

Embodiments of the present invention provide a dual positive airway pressure system and methods. The system is relatively simple and inexpensive, and can be assembled, operated, disassembled, and cleaned with basic instruction and materials more easily than a traditional NIPPV device, particularly in resource-limited settings or during pandemics when there is a shortage of staff with extensive discipline-specific training. The system can be operated without electricity provided that a source of pressurized breathing gas, such as medical air and oxygen, is available. Alternatively, the system can be operated with the benefit of an electric pump that supplies the pressurized breathing gas. Thus, the system can be operated to aid breathing in environments with little or no electrical power or other resources available, by persons without advanced discipline-specific training. Additionally, a simple, mass producible, non-electric device to provide NIPPV respiratory support for patients during a pandemic could be helpful in any setting.

In an aspect of the present invention, a respiratory delivery system provides a bi-level pressure airflow. The system includes a gas supply, a patient interface, and a bi-level pressure regulator. The gas supply is coupled to the patient interface via a first conduit. The bi-level pressure regulator includes a low-pressure regulator and a high-pressure regulator. The patient interface is coupled to the pressure regulator via a second conduit. The bi-level pressure regulator is configured to release gas through the low-pressure regulator or the high-pressure regulator. A low-pressure level is maintained when gas is released through the low-pressure regulator. A high-pressure level is maintained when the low-pressure regulator is obstructed, and gas is released through the high-pressure regulator. The bi-level pressure regulator is configured to cyclically obstruct and release the passage of gas through the low-pressure regulator to produce a first bi-level pressure level airflow.

In another aspect of the present invention, a respiratory delivery system provides a bi-level pressure airflow. The system includes a respiratory circuit and a pneumatic circuit. The respiratory circuit includes a respiratory gas supply and a patient interface. The respiratory gas supply supplies a respiratory gas airflow to the patient interface. The respiratory gas supply is coupled to the patient interface via a first conduit. The bi-level pressure regulator is coupled to the patient interface via a second conduit, and cyclically alternates a pressure level of the respiratory gas airflow passing through the bi-level pressure regulator between a low-pressure level and a high-pressure level. The pneumatic circuit includes pneumatic cycler that outputs a pneumatic gas airflow with a cycling pressure level. The pneumatic cycler is coupled to the bi-level pressure regulator via a third conduit. The bi-level pressure regulator is configured to cyclically alternate the pressure level of the respiratory gas airflow between the low-pressure level and the high-pressure level with the timing (though not necessarily the levels of pressure) defined by the cycling pressure level of the pneumatic gas airflow.

In a further aspect of the present invention, the pneumatic cycler includes a fluid column and optionally a spring-based pressure-relief valve. A source of pneumatic gas at a constant airflow is coupled to the pneumatic cycler.

In another aspect of the present invention, the pneumatic cycler is a bubbling pneumatic cycler that includes a container for supporting a volume of water, a pipe disposed in the container and submerged into the volume of water. The pipe receives a flow of a pneumatic gas from a pneumatic gas source. An oscillatory relief valve mechanism is positioned along the pipe. The oscillatory relief valve comprises a float configured to capture gas bubbles released through at least one first vent opening in the pipe when the float is in a lower position along the pipe. The float is a variable buoyancy float that rises through the volume of liquid to an upper position above the lower position when a collection of the gas bubbles increases the buoyancy of the float. The float releases the collection of gas bubbles when the float is in the upper position. The float converts the constant airflow of the pneumatic gas received by the pipe into a second bi-level pressure airflow.

In yet another aspect of the present invention, the respiratory delivery system can include at least one of a humidification system providing a selected humidity level and a heating system providing a selected temperature level. The first conduit can be coupled to at least one of the humidification system and the heating system.

In a further aspect of the present invention, the low-pressure level is a baseline pressure level, and the high-pressure level is a peak pressure level. The bi-level pressure regulator cyclically transitions the respiratory bi-level pressure level airflow 10-40 cycles/minute. The cycling rate is defined by a selected flow rate of the source of pneumatic gas.

In another aspect of the present invention, the respiratory gas source can supply a larger quantity of gas than the pneumatic gas source.

In yet another aspect of the present invention, a pressure level of the respiratory gas airflow is at a low-pressure level when a pressure level of the pneumatic gas airflow is at a low-pressure level, while the pressure level of the respiratory gas airflow is at a high-pressure level when the pressure level of the pneumatic gas airflow is at a high-pressure level. Alternatively, the technology could be configured such that the pressure level of the respiratory gas airflow is at the low-pressure level when the pressure level of the pneumatic gas airflow is at a high-pressure level, while the pressure level of the respiratory gas airflow is at the high-pressure level when the pressure level of the pneumatic gas airflow is at a low-pressure level.

These and other objects, advantages, purposes, and features of the present invention will become apparent upon review of the following specification in conjunction with the drawings.

DESCRIPTION OF THE PREFERRED EMBODIMENTS

Figure 1:
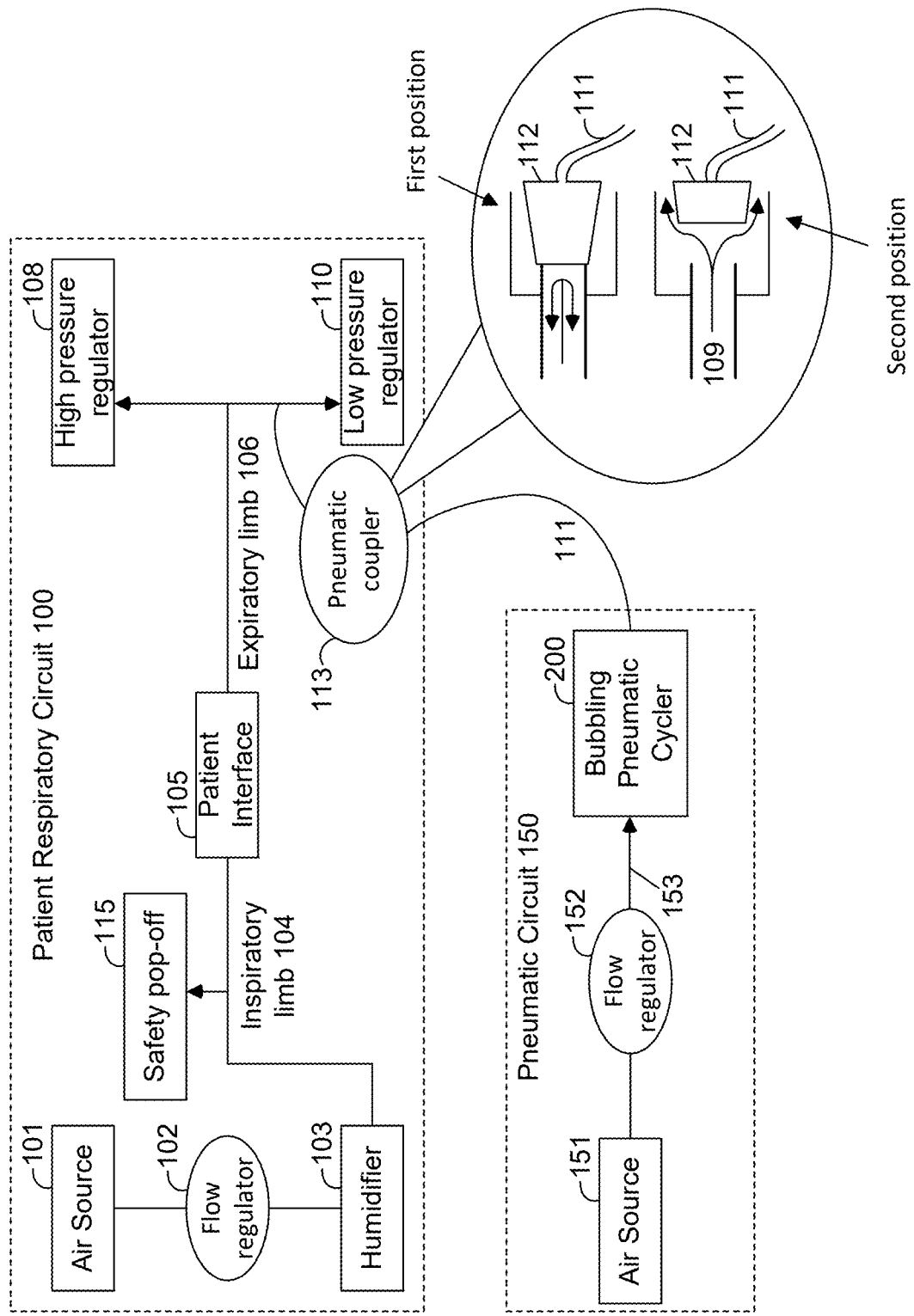
FIG. 1 is a block diagram of an exemplary respiratory delivery system that incorporates a patient respiratory circuit and a pneumatic circuit in accordance with the present invention.

Referring to the drawings and the illustrative embodiments depicted therein, a dual-pressure respiratory assistance device utilizes a float for cycling between a low, baseline pressure level and a high, peak pressure level. The cycling between the baseline pressure level and the peak pressure level is accomplished with a single power source, e.g., an air supply. For example, the pressure level may cycle between a low, baseline pressure level, such as a prescribed pressure level during patient exhalation, and a high, peak pressure level, such as a prescribed high-pressure level to assist patient inhalation. Alternatively, the cycling between a high-pressure and low-pressure may not directly correspond with patient respiratory efforts. The respiratory assistance device includes a pneumatic circuit and a patient respiratory circuit, which need not be fluidly connected with each other. The respiratory assistance device also includes a central pipe (around which a float rises and falls) with a first set of "proximal" vent holes. The patient respiratory circuit includes pressure regulators, with which the high- and low-pressure levels in the patient respiratory circuit can be set.

Referring now to FIG. 1, an exemplary respiratory assistance device 10 includes a patient respiratory circuit 100 and a pneumatic circuit 150. The pneumatic circuit 150 includes a bubbling pneumatic cycler 200 that cycles the air pressure in the patient respiratory circuit 100. An air source 151 provides a source of gas for the pneumatic circuit 150. This supplied gas can be a single or a blended combination of a variety of gases, but will henceforth be referred to as "air" for the sake of simplicity. This air is passed through a flow regulator 152, such as a needle valve, which can regulate the flow of air. The flow regulator 152 may include a flow meter. Varying the flow rate of the air varies the cycling rate of the bubbling pneumatic cycler 200, and by extension, of the cycling rate of a pressure waveform delivered in the patient respiratory circuit 100.

Note that the pneumatic circuit 150 and the patient respiratory circuit 100 of the respiratory assistance device 10 can have separate air sources or a single air source. A suitable connector, such as a Y or T connector, can be used to split air from a single source to both circuits. It is important to have independent control of the flow rates in the patient and pneumatic circuits 100, 150. This could be achieved through a variety of combinations of multiple flow regulators. For example, flow regulators with optional flow indicators could be placed in a common branch and a patient branch, the common branch and a pneumatic branch, or the pneumatic branch and the patient branch. In the absence of a leak, the airflow in the common branch is equal to the arithmetic sum of the airflow in the patient branch and the pneumatic branch Air in the pneumatic circuit 150, from whatever source and of whatever composition, is fluidly connected through appropriate tubing and adaptors to the bubbling pneumatic cycler 200. The components and function of the bubbling pneumatic cycler 200 are described in further detail herein.

Concerning the patient respiratory circuit 100, a compressed gas source 101 for the patient respiratory circuit 100 provides breathable gas suitable for respiratory assistance (e.g., medical grade compressed air). The compressed air source 101 of the patient respiratory circuit 100 may incorporate an exemplary air/oxygen blender for blending in a desired quantity of compressed oxygen into a supply of medical grade air. The compressed gas source 101 may also include, or be coupled to, a valve or flow regulator 102 and flow meter for controlling and measuring the flow of breathable gas. The flow meter provides a measurement of a quantity of air, oxygen, blended air/oxygen or other breathable gas, allowing measurement in units such as liters of gas per minute (L/min). The breathable gas, such as a blended mixture of air and oxygen, is optionally passed through an inline humidifier 103, which humidifies the supplied breathable gas to a desired humidification level. The humidifier 103 may also heat the supplied breathable gas to a desired temperature level. Alternatively, an additional inline device may be used to heat the supplied breathable gas. The breathable gas, such as a blended mixture of air and oxygen, whether or not humidified and/or heated, is then passed through a patient interface 105, which may include a mask or occlusive prongs.

Optionally, a filter such as a heat moisture exchanger may be placed in the patient interface 105 or in a section of the expiratory tubing 106 close to the patient interface 105. This could trap some of the moisture exhaled by the patient, decreasing the amount of fluid the patient loses to the environment. This could be particularly helpful in settings that lack heating and humidification of the patient respiratory circuit 100. Depending on the type of filter, this could also prevent the exhalation of infectious organisms such as bacteria or viruses, which could be helpful in preventing the spread of disease in the healthcare setting.

The breathable gas provided to the patient interface 105 may be considered part of an inhalation or inspiratory limb 104 of the patient respiratory circuit 100, with the breathable gas exiting the patient interface 105 considered an exhalation or expiratory limb 106 of the patient respiratory circuit 100. It is this output of the patient interface 105 (the expiratory limb 106) that includes high and low pressure regulators 108, 110. The timing of the low-pressure regulator 110 is determined by the bubbling pneumatic cycler 200. The components of the patient respiratory circuit 100 are interconnected via suitable conduits, such as plastic respiratory tubing sections. Such tubing sections may be formed with flexible or rigid sections.

In the expiratory limb 106, the air can exit the patient respiratory circuit 100 through one of two pathways: the low-pressure regulator 110 or the high-pressure regulator 108. The pressure regulators (108, 110) are designed to release air in the circuit once the pressure has built up to a prescribed level. Thus, if air from the patient respiratory circuit 100 exits the circuit through the low-pressure regulator 110, a low-pressure level set by the low-pressure regulator 110 is maintained in the patient respiratory circuit 100. If the passage of air through the low-pressure regulator 110 is blocked, air instead passes through the high-pressure regulator 108. This similarly results in a high level of pressure in the patient respiratory circuit 100. By cyclically routing the path of air through the high- or low-pressure regulators 108, 110, pressure in the patient respiratory circuit 100 can be cycled between low- and high-pressure levels. The low- and high-pressure levels are set by the low- and high-pressure regulators, respectively.

Figure 5A:
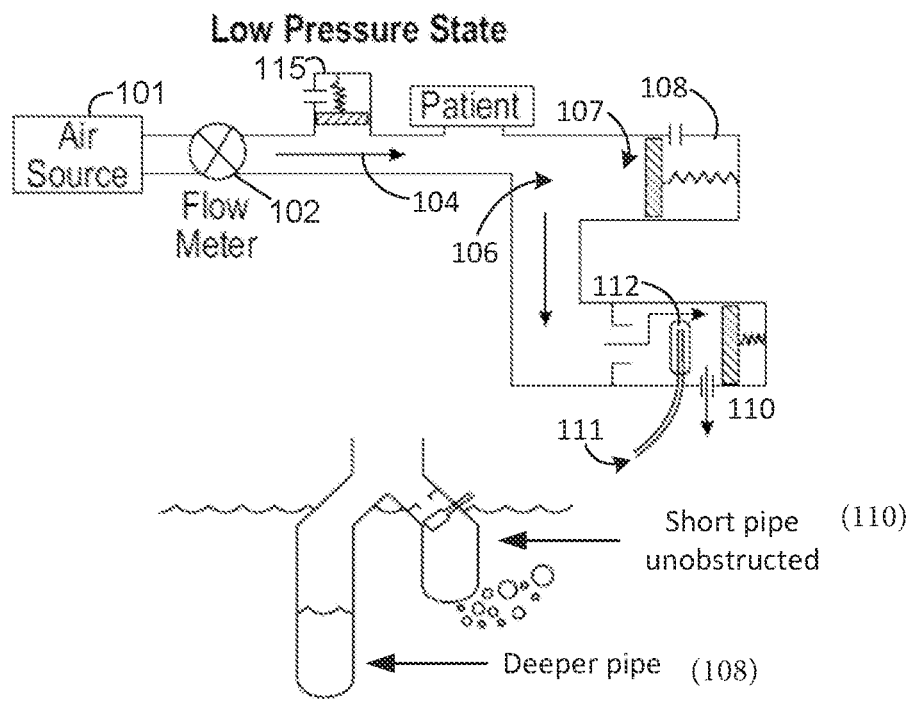
FIG. 5A is a block diagram of an exemplary patient respiratory circuit configured to deliver low pressure gas in accordance with the present invention.
Figure 5B:
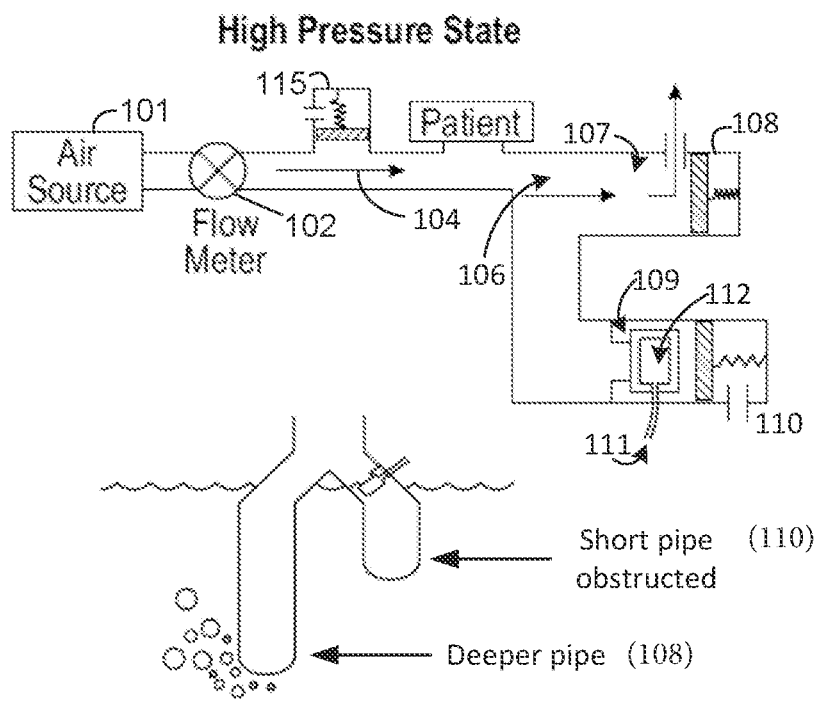
FIG. 5B is another block diagram view of the patient respiratory circuit of FIG. 5A configured to deliver high pressure gas in accordance with the present invention.

There are many standard designs of pressure regulators that could be utilized for this purpose. For example, with a spring-based pressure relief valve, turning a dial would tighten or release a spring that is connected to a diaphragm that seals the exit of air out of the patient respiratory circuit 100. Once the pressure in the circuit builds up to a level sufficiently large enough to counteract the pressure due to the spring (in the spring-based pressure relief valve), the spring is compressed and the diaphragm moves, opening a pathway for the release of air. Alternatively, as shown in FIGS. 5A and 5B, a water column could be utilized in which pipes fluidly connected to the expiratory limb are submerged in water. For water to bubble out of the pipe, pressure in the attached patient respiratory circuit 100 must reach a level proportional to the submerged depth of bubbling. As FIG. 5A shows, if water bubbles out of the shorter pipe (i.e., the low-pressure regulator 110), a low level of pressure is maintained in the respiratory circuit. As FIG. 5B shows, if the passage of gas out of the shorter pipe 110 is obstructed such that gas is instead routed out of the deeper pipe (i.e., the high-pressure regulator 108), a high level of pressure is maintained in the respiratory circuit. If the bubbling orifices are small, this resistance to airflow could also affect the pressure in the patient respiratory circuit 100.

While pressure regulators could be placed in the inspiratory limb 104 rather than in the expiratory limb 106 of the patient respiratory circuit 100, this could lead to undesirable effects such as increased patient respiratory circuit 100 dead space, resulting in increased re-breathing of expired carbon dioxide. In addition to the high- and low-pressure regulators 108, 110, an additional safety pressure-relief valve, or safety pop-off valve 115 (illustrated in FIG. 1), could be added to the patient respiratory circuit 100 to limit the level of pressure that would be delivered to the patient if the high-pressure regulator 108 failed.

The function of the exemplary bubbling pneumatic cycler 200 is to alternately obstruct and release the passage of air through the low-pressure regulator 110. This could be accomplished through several mechanisms using standard components. An exemplary pneumatic coupler 113 is depicted in FIG. 1, which includes an exhalation diaphragm 112, which is designed to obstruct the passage of air out of the patient respiratory circuit 100 when it is pressurized and to release air out of the patient respiratory circuit 100 when it is not pressurized. The bubbling pneumatic cycler 200 is fluidly connected with the exhalation diaphragm 112 such that pressure can be transmitted from the bubbling pneumatic cycler 200 to the diaphragm 112. The diaphragm 112 can serve as a barrier to isolate the bubbling pneumatic cycler 200 from the patient respiratory circuit 100. As illustrated in FIG. 1, when the bubbling pneumatic cycler 200 is at a high-pressure level, the diaphragm 112 is in a "first position" such that air in the patient respiratory circuit 100 cannot pass around the diaphragm 112 and thus cannot reach the low-pressure regulator 110. Air from the patient respiratory circuit 100 is instead forced to exit the patient respiratory circuit 100 through the high-pressure regulator 108. When the bubbling pneumatic cycler 200 is at a low level of pressure, the diaphragm 112 is in a "second position," such that air in the patient respiratory circuit 100 can pass around the diaphragm 112 to the low-pressure regulator 110. The number and size of the orifices through which the air passes around the diaphragm 112 can be varied. In this manner, the timing of the bubbling pressure cycler 200 sets the timing of cycling between low- and high-pressure levels in the patient respiratory circuit 100.

The exemplary diaphragm 112 can be modified with, for example, springs to make it more easy or difficult to move to the first position, the second position, or both positions as desired. Instead of a diaphragm that prevents or permits access to the low-pressure regulator 110, other similar mechanisms for the pneumatic coupler 113 for achieving the same purpose could be readily utilized. For example, an inflatable member which is fluidly connected to the bubbling pneumatic cycler 200 could be placed in the low-pressure passageway, such that when the inflatable member is pressurized (and thereby expanded in volume), air in the patient respiratory circuit 100 cannot reach the low-pressure regulator 110. When the inflatable member is not pressurized, air in the patient respiratory circuit 100 can reach the low-pressure regulator 110 (see FIGS. 5A and 5B). Similarly, other custom developed or "off-the-shelf" mechanisms could be used to harness the pressure from the bubbling pneumatic cycler 200 to alternately obstruct and release the passage of gas through the low-pressure regulator 110. The mechanisms, e.g., a diaphragm or inflatable member, are hereafter referred to as the "pneumatic coupler 113."

Note that an inverse ratio of high- to low-pressure could be delivered by modifying the pneumatic coupler 113. Specifically, the exemplary pneumatic coupler 113 could be modified such that it allows the passage of air to the low-pressure regulator 110 when the pneumatic coupler 113 is pressurized, but obstructs the flow of air to the low-pressure regulator 110 when the pneumatic coupler 113 is at a low-pressure level. In this manner, when the pressure level is high in the pneumatic circuit 150, the pressure level is low in the patient respiratory circuit 100, and when the pressure level is low in the pneumatic circuit 150, the pressure level is high in the patient respiratory circuit 100. This could be helpful for delivering inverse ratio treatments such as Airway Pressure Release Ventilation (APRV).

As discussed herein, in conventional pressure ventilation circuits, a similar system may be used, except that instead of the bubbling pneumatic cycler 200 functionally occluding the passage of air through the low-pressure regulator 110, another mechanism is used to obstruct the passage of air through the low-pressure regulator 110.

Figure 2:
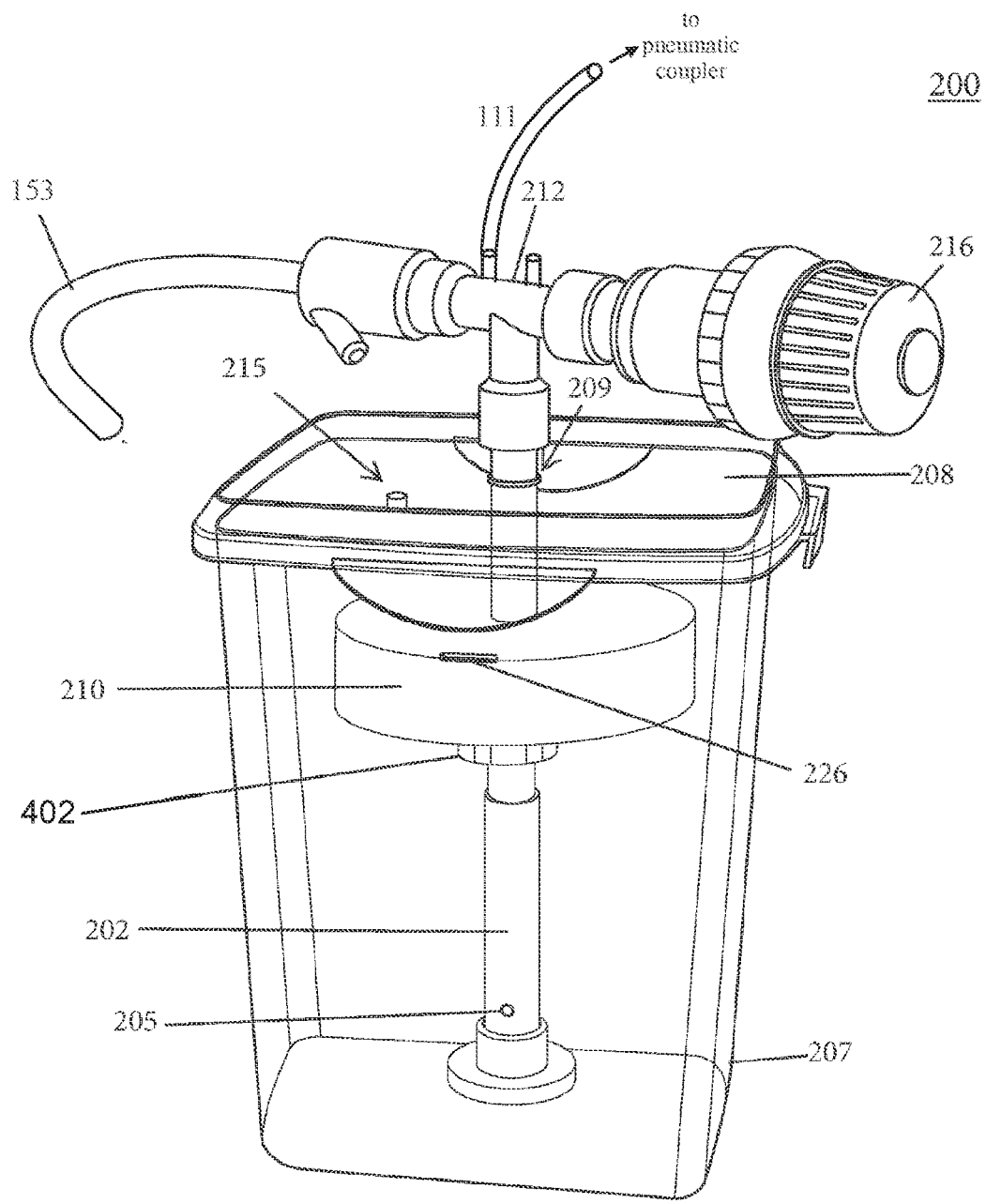
FIG. 2 is a side perspective elevation view of a bubbling pneumatic cycler in accordance with the present invention.
Figure 3:
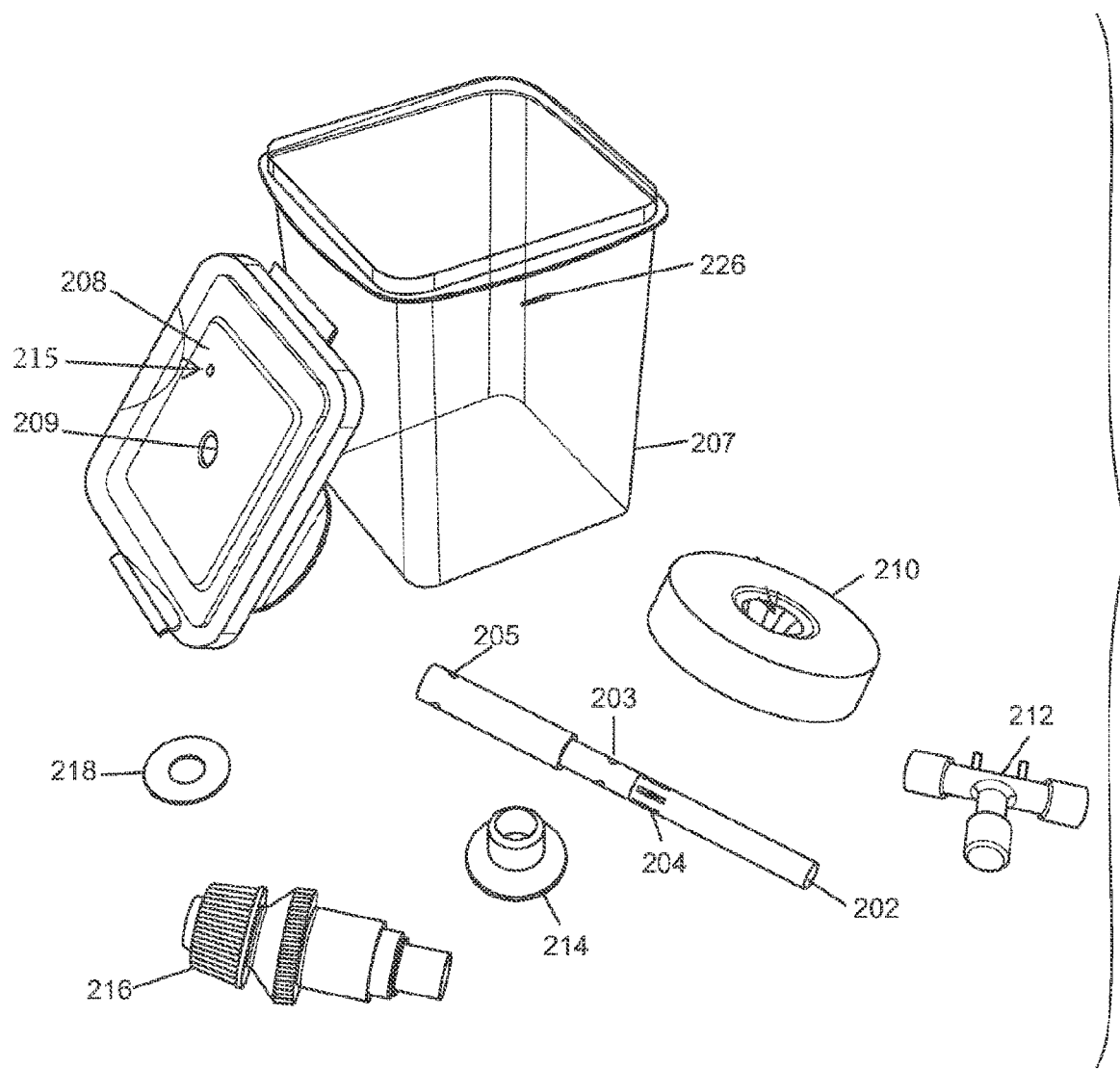
FIG. 3 is a side perspective view illustrating the disassembled components of the bubbling pneumatic cycler of FIG. 2.

As illustrated in FIGS. 2 and 3, the obstruction of the passage of air through the low-pressure regulator 110 is controlled with an exemplary bubbling pneumatic cycler 200. As illustrated in FIG. 2, the bubbling pneumatic cycler 200 includes a central pipe 202 that is submerged into a column of fluid. Suitable sources may be used, e.g., distilled water. An exemplary oscillatory or cyclical mechanism of the bubbling pneumatic cycler 200 comprises a variably buoyant float ("float") 210 and a set of proximal vent holes 203 in the central pipe 202 (see FIG. 3) that selectively release gas bubbles from the central pipe 202 (which are temporarily captured or entrapped by the float 210). Optionally, an adjustable pressure regulator or pop-off valve 216 can limit the set point for a high, peak pressure level in the pneumatic circuit 150.

Such bubbling pneumatic cyclers are also described in international application serial No. PCT/IB2019/052768 ("the '768 patent application"), the disclosure of which is hereby incorporated herein by reference.

In the '768 patent application, there is a single circuit, namely the patient respiratory circuit. Air in the expiratory limb of the patient respiratory circuit powers the bubbling pneumatic cycler. Thus, the bubbling pneumatic cycler must be designed (for example by adjusting float weight and volume) to deliver appropriate pressure waveforms within the range of flows typically delivered to patients. For example, if the bubbling pneumatic cycler has been designed to provide support for infants in respiratory distress, it will operate within a certain range of flows (e.g. 4-8 liters per minute). To support larger patients, larger airflow rates (e.g. greater than 40 liters per minute) are needed to deliver adequate breathing support. Otherwise, the patient may experience flow starvation, in which the delivered volume of air is less than that which the patient requires. Thus, in the '768 patent application, the bubbling pneumatic cycler must be re-designed to operate with much greater flows, such as with a correspondingly larger float weight and volume.

The exemplary respiratory assistance device 10 separates the pneumatic circuit 150 from the patient respiratory circuit 100, such that separate airflow rates can be used in each circuit (100, 150). To support larger patients, a larger airflow rate is used in the patient respiratory circuit 100, without necessarily affecting the bubbling pneumatic cycler 200. To support smaller patients, a smaller airflow rate is used in the patient respiratory circuit 100, also without necessarily affecting the bubbling pneumatic cycler 200. Similarly, the airflow rate in the pneumatic circuit 150 can be increased or decreased without necessarily affecting the patient respiratory circuit 100. Uncoupling the airflow rates in the pneumatic circuit 150 and patient respiratory circuit 100 releases many of the design constraints on the '768 patent application.

The bubbling pneumatic cycler 200 cycles the air pressure level provided in the patient respiratory circuit 100 to the patient interface 105 between a low, baseline pressure level, and a high, peak pressure level. As discussed herein, the baseline pressure level may be a prescribed low-pressure level, and the peak pressure level may be a prescribed high-pressure level. The respiratory device therefore provides an exemplary bi-level pressure waveform where a lower, baseline pressure level is alternatively maintained during a first duration, and a peak pressure level is maintained during a second duration. By adjusting the airflow rate at the air supply 101 in the patient respiratory circuit 100, different volumes of air can be delivered to the patient via the patient interface 105. By adjusting the airflow rate at the air supply 150 in the pneumatic circuit 150, the cyclic rate between the baseline and the peak pressure levels is adjusted (e.g., between 20-40 cycles per minute).

As illustrated in FIGS. 2 and 3, the column of water is enclosed within a container 207 having lid 208 to reduce water loss due to evaporation or sloshing. The container 207 may be manufactured of a variety of suitable materials, such as injection-molded plastic, glass, metal, or combinations thereof, and is preferably made of a transparent material to facilitate viewing of the gas bubbles, water levels, and float operation. As illustrated in FIG. 2, the container 207 may comprise a rectangular shape or a cylindrical shape. The lid 208 may be fitted with clasps, threads or other means for securing the lid 208 to the container 207, thus preventing loss of water. As illustrated in FIG. 2, the lid 208 is dimensionally configured to fit to the container 207. The lid 208 may also include an air vent 215. The container 207 is filled with water to form a desired column of water, within which the float 210 will cycle.

Although the baseline pressure in the patient respiratory circuit 100 is set with the low pressure regulator 110, the height of the column of water in the container 207 sets the baseline pressure level in the pneumatic circuit 150, which can affect the baseline pressure in the patient respiratory circuit 100. For example, depending on the mechanics of the pneumatic coupler 113, the baseline pressure level in the patient respiratory circuit 100 could be equal to the baseline pressure level in the pneumatic circuit 150 plus the pressure level set on the low-pressure regulator. One or more markings 226 may be scribed upon the container 207 for aiding in achieving a desired height of the column of water. For example, an exemplary marking 226 is used to indicate that a water line at the marking 226 realizes a low, baseline pressure level of 5 cm H₂O in the pneumatic circuit 150 (that is, an air-water meniscus layer and bubbling from vent holes 203 on the central pipe 202 occurs five (5) centimeters beneath the top of the column of water). The low, baseline pressure level in the pneumatic circuit 150 is adjusted (e.g., from 5 to 8 cm H₂O) by varying the height of the column of water in the container 207.

As also illustrated in FIGS. 2 and 3, the bubbling pneumatic cycler 200 is formed of individual parts that are readily disassembled for cleaning, disinfection, sterilization, and/or storage. For example, a source of compressed air 151 (from FIG. 1) connects to the bubbling pneumatic cycler 200 via tubing 153 coupled to a T-joint 212. As illustrated in FIG. 3, the T-joint 212 is a T-shaped plastic conduit or pipe with a pair of opposite openings, two upper openings, and a single lower opening. As illustrated in FIGS. 1 and 2, the air source 151 is connected through tubing 153 to one side of the T-joint 212, while a pressure regulator 216 can be connected to the opposite side of the T-joint 212. One upper connection of the T joint can be connected to a system for monitoring the pressure in the pneumatic circuit 150. This upper connection is not essential for the function of the bubbling pneumatic cycler 200. An additional upper connection of the T joint connects to tubing 111, through which the pressure level is delivered to the pneumatic coupler 113 in the patient respiratory circuit 100. The bottom of the T-joint 212 is connected to an upper end of a central pipe 202 of the bubbling pneumatic cycler 200. Connectors with varying geometry could be similarly used to connect the air source 151, the bubbling pneumatic cycler 200, the pneumatic coupler 113, the optional pressure regulator 216, and the optional pressure measurement system. An exemplary central pipe 202 is an extruded plastic hollow cylinder with machined sidewall recesses such as grooves 204 formed or established on one end, a set of proximal vent holes 203 below the grooves 204, and optionally a set of distal vent holes 205 on an opposite, bottom end of the central pipe 202. A step change in pipe diameter (larger diameter on the bottom) provides a shoulder for the float 210 to rest in the lower position. Optionally, the central pipe 202 is formed by combining two separate pipes. The bottom end of the central pipe 202 is connected to an anchor 214 of the respiratory device 200. The anchor 214 may aid in holding the central pipe 202 to the bottom of the container 207. A base of the anchor 214 may also be configured to aid in stabilizing the central pipe 202 when placed onto the bottom of the container 207, through friction and/or possible bonding with an adhesive agent.

Referring to FIGS. 2 and 3, and as discussed in detail below, an exemplary variable buoyancy float 210 is configured for insertion over the central pipe 202. An exemplary float 210 is of injection-molded plastic construction, with an inner sleeve 402 and a portion for retaining escaping gas bubbles at its upper end. Lower openings in the inner sleeve 402 permit the escape of gas bubbles from at least one proximal vent hole 203 into the float 210. Upper openings in the inner sleeve 402 permit release of gas bubbles retained by the float 210 when the float is elevated. Optionally, the lower and upper openings is combined into a single larger opening, as in a vertically oriented slot, that both admits gas from the vent hole 203 at its lower end, and vents the gas through the grooves 204 at its upper end.

The variable buoyancy float 210 can be fitted with a weighted washer 218 to provide a negative buoyancy for the float 210. The float 210 itself may be made from denser-than-water material, such as polymeric resin, which may obviate the need for a separate weight. The float's negative buoyancy is overcome when the float 210 retains a sufficient collective volume of the escaping gas bubbles and becomes positively buoyant. It is envisioned that additional or different weights may be selected to adjust the overall weight of the float 210 and, thus, the volume of gas that must be collected by the float 210 before it will become buoyant.

Figure 4A:
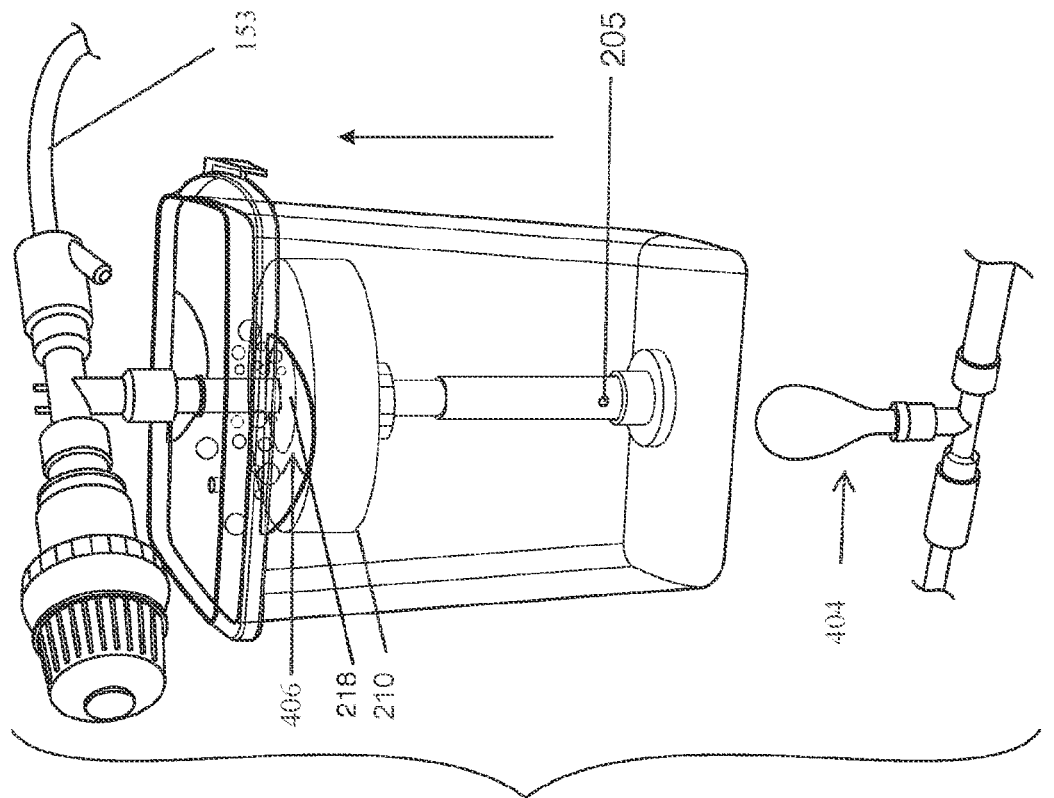
FIG. 4A is a side perspective view of the bubbling pneumatic cycler of FIG. 2 illustrating a float in a first position providing a low, baseline pressure level when a sleeve of the float exposes proximal vent holes on the central pipe, allowing air bubbles to escape.
Figure 4B:
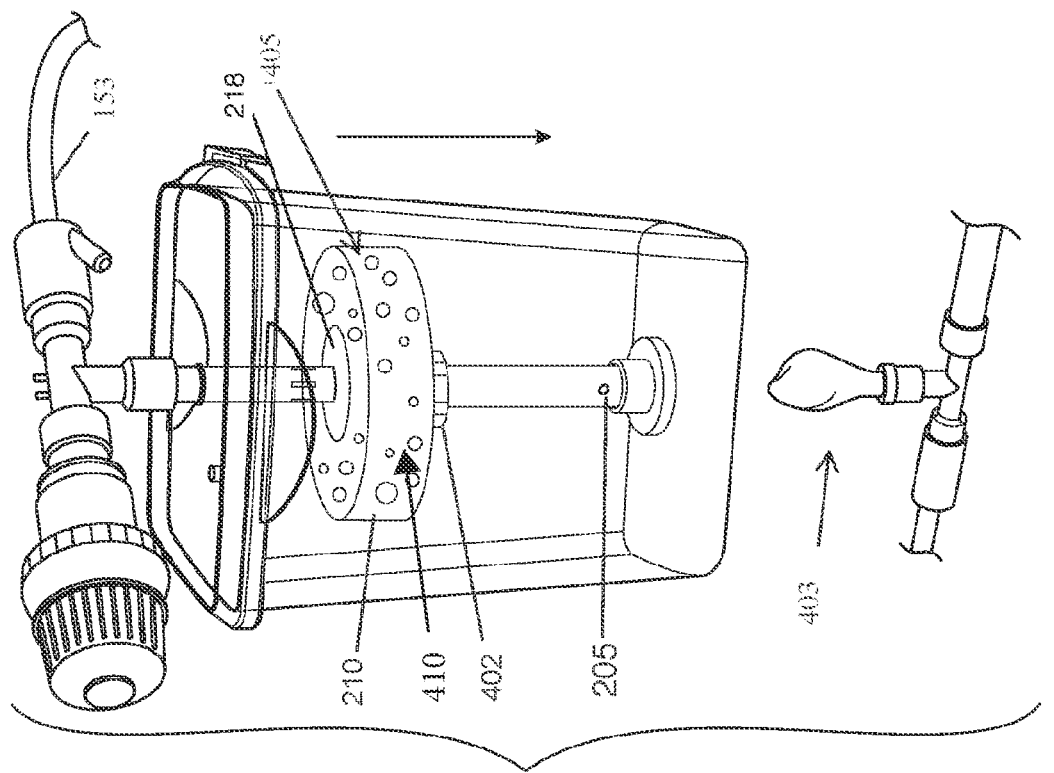
FIG. 4B is another side perspective view of the bubbling pneumatic cycler of FIG. 2 illustrating the float in a second position providing a high, peak pressure level when the sleeve of the float occludes the proximal vent holes on the central pipe, preventing air bubbles from escaping.

The float 210, fitted with the weighted washer 218 (to provide a negative buoyancy that is offset when air bubbles are retained within the float 210), is inserted over the central pipe 202. As illustrated in FIGS. 2, 4A, and 4B, the central pipe 202, float 210, and weighted washer 218 are inserted into the container 207. Once the lid 208 has been fastened on, the upper end of the central pipe 202 will extend from out of the container 207, via a hole 209 positioned in the center of the lid 208. Before the lid 208 is secured, the container 207 will be filled with water to create a column of water to the scribed mark 226. Note that the level of water can be adjusted (after securing the lid 208) through the air vent 215. Optionally, a funnel could be utilized to fill water through the air vent 215, making it easier to add water. The T-joint 212 is connected to the upper end of the central pipe 202. The air source 151 of the pneumatic circuit 150, via tubing 153, is connected to one side of the T-joint 212, while the optional pressure regulator 216 could be connected to the opposite side of the T-joint 212.

As illustrated in FIG. 3, the upper portion of the central pipe 202 has a cross-section with a single, consistent diameter. The upper portion of the central pipe 202 is configured with a series of venting grooves 204 that are cut, molded or otherwise formed into the surface of the central pipe 202 to form shallow, partial-depth vent channels in the outer surface of the central pipe 202. Multiple grooves 204 are arranged around a circumference of the central pipe 202. As also illustrated in FIG. 3, the central pipe 202 is configured with a series of proximal vent holes 203 for the passage of gas bubbles from the central pipe 202 (at the proximal holes 203). The escaping gas bubbles are captured and retained by the float 210, and are later vented (during each float cycle) at the venting grooves 204 when the float 210 is elevated. Optionally, the central pipe 202 includes one or more distal vent holes 205 that limit the maximum air pressure that can be achieved inside the central pipe 202 (and, therefore, in the pneumatic circuit 150) regardless of the pressure setting at optional regulator 216.

As illustrated in FIGS. 2, 4A, and 4B, the float 210 has an inner sleeve 402 that includes openings for the passage of air bubbles, into and out of the float 210. As illustrated in FIG. 4A, an interior space 410 of the float 210 is provided for temporarily retaining the gas bubbles 405. When the float 210 is negatively buoyant and resting in a first or lowered position, the sleeve 402 will be positioned with respect to the central pipe 202 such that gas bubbles escaping from the proximal holes 203 will enter the interior space 410 of the float 210. As illustrated in FIG. 4B, when the float 210 is positively buoyant and floating in a second or elevated position, gas retained in the interior space 410 of the float 210 will be allowed to escape from the float via the grooves 204. That is, when float 210 is elevated, vent grooves 204 form a series of vent channels through which the gas bubbles 406 escape out of the interior space 410 of float 210. Such entry and exit of the gas bubbles into and out of the interior space 410 of the float 210 allows for the variable buoyancy of the float 210. It will be appreciated that the above-described principle of a single pipe 202 designed to provide venting channels for a variable buoyant float can be readily implemented in other forms, without departing from the spirit and scope of the present disclosure. For example, an alternate venting geometry could be utilized as long as it appropriately interfaces with openings in the ceiling of float 210: when float 210 is in a low position, venting should not occur, and when float 210 is in a high position, venting should occur.

When the float 210 is slid over the central pipe 202, the diameter of the inner sleeve 402 is such that the inner sleeve 402 fits sufficiently snugly against the central pipe 202 to substantially prevent air from escaping between the sleeve 402 and the pipe 202 when the float 210 is below its elevated position, but the inner sleeve 402 is also sufficiently loose to permit substantially free sliding of the float 210 along its pipe 202, preferably without undue friction. Also, the diameter of the inner sleeve 402 is such that when the float 210 is floating, buoyant, in the upper, second position, the holes 203 in the corresponding central pipe 202 will be occluded (blocked, such that gas bubbles are not allowed to escape via the proximal holes 203).

Note that the inner sleeve 402 can be fashioned of various materials, such as metal or plastic. In addition, the inner sleeve 402 can be formed from multiple components. For example, as illustrated in FIGS. 3, 4A, and 4B, the inner diameter of the washer 218 forms the upper edge of the inner sleeve 402.

Referring to FIG. 4, and as discussed herein, the float 210 is configured to cycle through the water between the first lower position (in which the weight due to gravity is greater than the buoyancy of the float 210, alternatively abbreviated as the "negative buoyancy" position), and the second, higher position (in which the weight due gravity is less than the buoyancy of the float 210, alternately abbreviated as the "positive buoyancy" position). As illustrated in FIG. 4A, when the float 210 is negatively buoyant, the float 210 has sunk through the water to the first position. Because of the weighted washer 218 (or denser-than-water material selected for the float 210 and/or inner sleeve 402), when the float 210 is sufficiently empty of retained gas, the float 210 will have a negative buoyancy. As illustrated in FIG. 4B, when the float 210 is positively buoyant due to the accumulation of bubbles in the umbrella-like interior space 410, the float 210 has risen through the water to the second position.

As illustrated in FIGS. 4A and 4B, when the float 210 is in the lower first position (the negative buoyancy position), the proximal holes 203 of the central pipe 202 are oriented such that gas in the central pipe 202 is allowed to escape as gas bubbles (that is, the sleeve 402 of the float 210 will not occlude the proximal holes 203). As illustrated in FIG. 4A, the escaping gas bubbles 405 are captured and retained by the float 210. The escaping gas (at the proximal holes 203) maintains the pressure level in the pneumatic circuit 150 at the lower pressure level, while the float 210 is at the lower first position and bubbles are escaping from the proximal vent holes 203, (setting the air-water meniscus level in the central pipe 202 at the vent holes 203). The lower, baseline pressure level in the pneumatic circuit 150 is illustrated in FIG. 4A with a partially deflated balloon or test lung 403, which can be used as a simple visual pressure indicator during setup of the system. It will be appreciated that the time duration of the baseline pressure level may be selected by the size of the float's air chamber and the float's natural buoyancy, which affect the time duration required to cause a non-buoyant float to fill with a sufficient quantity of air to cause the float 210 to achieve sufficient positive buoyancy to rise above the first (lower) position along the central pipe 202.

As illustrated in FIG. 5A, when the pneumatic circuit 150 is at a low-pressure level, air in the patient respiratory circuit 100 can pass through the low-pressure regulator 110 as shown in FIG. 5A. Thus, the patient respiratory circuit 100 is pressurized to a low-pressure level. Depending on the mechanics of the pneumatic coupler 113, many factors can influence this low-pressure level. If there are minimal pressure losses due to friction as the air flows to the low-pressure regulator 110, and there is little resistance to move the diaphragm 112, the pressure in the patient respiratory circuit 100 will be close to that set on the low-pressure regulator 110.

However, if there are significant pressure losses due to friction as the air flows to the low pressure regulator 110 and/or the diaphragm 112 requires pressure to move, the resulting pressure in the patient respiratory circuit 100 may be higher than the value set on the low pressure regulator 110. Similar principles would apply for other coupling mechanisms.

As illustrated in FIG. 4B, when the float 210 is in the upper second position (the positive buoyancy position), gas bubbles 406 retained in the float 210 are allowed to escape via channels created by grooves 204 in the central pipe 202. When the float 210 is in the second position, the inner sleeve 402 of the float 210 is positioned to occlude the proximal holes 203 in the central pipe 202. With the proximal holes 203 occluded, gas is retained within the central pipe 202 (unable to escape through the proximal vent holes 203) and the pressure in the pneumatic circuit 150 rises to the higher, peak pressure level. This can be optionally set by the pressure regulator 216 or a distal series of vent holes 205. Alternatively, the high-pressure level can be indirectly set through the interaction of a variety of other factors such as the air flow rate in and the volume and compliance of the pneumatic circuit 150 (and anything in fluid connection with the pneumatic circuit 150). FIG. 4B illustrates that the higher, peak pressure level results in a more inflated balloon or test lung 404 (FIG. 4B, inset), which can be used as a simple visual pressure indicator during setup of the system. It will be appreciated that the time duration of the peak pressure level may be selected by the size of the vent grooves 204, which control the rate at which trapped air is released from the float 210 and, therefore, the "dwell time" at which the float remains in the second (elevated) position. It will further be appreciated that the float 210 may incorporate or define its own gas-venting opening that "leaks" collected gas at a desired rate, which can also provide a slower cycling rate by slowing the rate at which the float 210 collects gas while in its lower position. The gas-venting opening in the float 210 may be a fixed-size opening with an optional plug so that its use is discretionary, or may be an adjustable opening or valve that allows a user to change the rate at which gas is vented from the float 210 even while it is in the lower position.

When the bubbling pneumatic cycler 200 is in a high-pressure state, this pressure level is transmitted through tubing 111 to the pneumatic coupler 113, such that the passage of air from the patient respiratory circuit 100 to the low-pressure regulator 110 is obstructed. Thus, air instead leaves the patient respiratory circuit 100 through the high-pressure regulator 108, maintaining a high level of pressure in the patient respiratory circuit 100. As previously described, a diaphragm, an inflatable member or other mechanisms could be utilized for the pneumatic coupler 113.

This is also illustrated in FIG. 5B, that when the pneumatic circuit 150 is at a high-pressure level, air in the patient respiratory circuit 100 is blocked at the low-pressure regulator 110 by the inflated diaphragm 112. Blocked at the low-pressure regulator 110, the air is forced to exit through the high-pressure regulator 108. Thus, the patient respiratory circuit 100 is pressurized to the high-pressure level.

In this manner, the pneumatic circuit 150 affects the timing of pressure cycling in the patient respiratory circuit 100. The time that the float rises and seals off proximal vent holes 203 on the central pipe 202 sets the T high (the time at which pressure is at a high level) in the patient respiratory circuit 100. The time that the float is low (and allows bubbles to escape from the proximal vent holes 203 on the central pipe 202) sets the T low, the time at which the pressure is at a low level. Systems could be envisioned in which there is a delay in transmission of pressure from the pneumatic circuit 150 to the patient respiratory circuit 100, but there is nevertheless a relationship between the two. In contrast to these interdependences in timing, the levels of pressure and magnitude of airflow rate in the patient and pneumatic circuits 100, 150 can be set separately.

As illustrated in FIG. 4A, when the float 210 is resting in the first position, gas bubbles are exiting from the central pipe 202 (via the proximal holes 203) and are retained by the float 210 and changing the buoyancy of the float 210 until the float 210 is buoyant enough to float up to the second position. When the float's buoyancy has increased sufficiently to float up to the second position (positively buoyant), the proximal holes 203 in the central pipe 202 will be occluded by the inner sleeve 402 of the float 210. As also illustrated in FIG. 4B, when the float 210 is floating in the second position, gas bubbles are escaping from the float 210 (via the grooves 204) and reducing the buoyancy of the float 210 until the float 210 is negatively buoyant and sinks down to the first position.

It is noted that there is a possible intermediate position between the lower first position and the higher second position of the float 210 sliding on the central pipe 202. After the float 210 rises from the lower first position, the inner sleeve 402 may occlude the proximal venting holes 203 on the central pipe 202 before the float 210 has risen sufficiently to vent the retained air via the grooves 204 on the central pipe 202. This is considered the "intermediate position." Soon thereafter, the float 210 will rise such that the retained gas is vented via the grooves 204 of the central pipe 202.

Thus, the float 210 is configured to float between a first position, which results in a lower, pressure level, and a second position, which results in a higher, peak pressure level. The float 210 retaining gas bubbles via the holes 203 and losing gas bubbles via the grooves 204, results in the float 210 cycling between the negatively buoyant first position and the positively buoyant second position. The rate of oscillation or cycling is adjusted by varying the airflow rate at the air supply 151 of the pneumatic circuit 150. The higher the airflow rate at the air supply 102, the faster the bubbles will escape through the proximal vent holes 203 and the faster the resulting cycling rate. The cycling rate can also be increased by providing large grooves or vent channels to quickly release entrapped air when the float 210 reaches the second position. Optionally, a calibrated gas vent in the float 210 can increase the time required to fill the float 210 with air from the proximal vent holes 203 in the central pipe 202, increasing the time the float 210 stays in the lower first position and lowering the cycling rate. For example, an exemplary setting of 4 L/min flow rate (at the air supply 151) of the pneumatic circuit 150 will realize approximately 20 cycles per minute. Similarly, an exemplary setting of 8 L/min (at the air supply 151) of the pneumatic circuit 150 will realize approximately 40 cycles per minute.

As previously described, depending on the mechanics of the pneumatic coupler 113, the timing of the high- and low-pressure levels in the patient respiratory circuit 100 could either coincide with or be the opposite of the timing of the high- and low-pressures in the pneumatic circuit 150. An "inverse ratio," in which the patient respiratory circuit 100 is at a high-pressure level for a long time, such as 5 seconds, followed by a drop to the low-pressure level for a shorter time, such as 0.5 seconds, could be desirable for the delivery of treatments like Airway Pressure Release Ventilation.

Figure 6A:
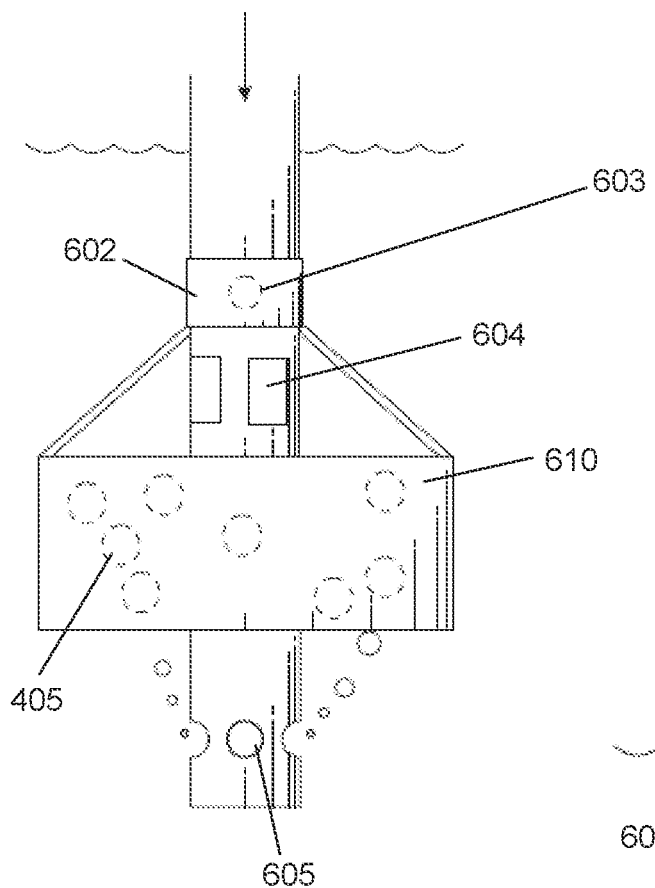
FIG. 6A is side view of an alternative bubbling pneumatic cycler that delivers an inverse ratio of respiratory support, and illustrating a float in a first position providing a high, peak pressure level when a sleeve of a float occludes proximal vent holes of a central pipe, preventing air bubbles from escaping.
Figure 6B:
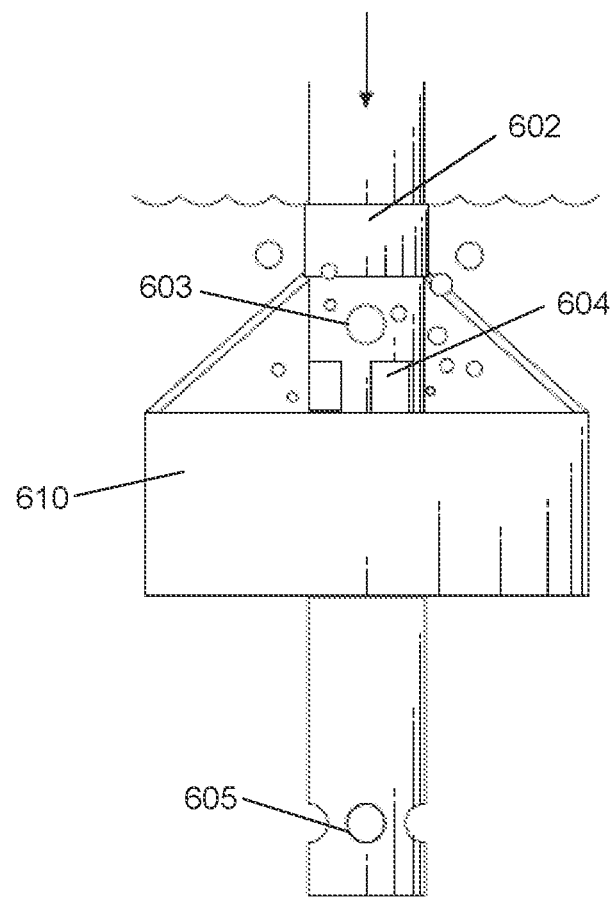
FIG. 6B is another side view of the alternative bubbling pneumatic cycler of FIG. 6A, and illustrating the float in a second position providing a low, baseline pressure level when the sleeve of the float exposes proximal vent holes on the central pipe, allowing air bubbles to escape.

Note that a similar treatment could be delivered without a modification to the pneumatic coupler 113 by instead modifying the bubbling pneumatic cycler 200. As illustrated in FIGS. 6A and 6B, a sleeve 602 initially covers the proximal vent holes 603 above a float 610; resulting in a high-pressure level while the float 610 is collecting bubbles 405. Eventually, once enough bubbles 405 have been collected, the float 610 becomes buoyant and rises, as illustrated in FIG. 6B, such that the sleeve 602 uncovers the proximal vent holes 603 which leads to a drop in pressure. As the float 610 rises, it encounters venting grooves 604 through which it vents the bubbles. This causes the float 610 to become negatively buoyant and sink, causing the sleeve 602 to re-occlude the proximal vent holes 603. Air is forced down to the distal holes 605, causing the pressure level to return to the high-pressure level. This process cyclically repeats.

This inverted cycling mechanism could be used as a modification to the '768 patent application to provide inverse ratio ventilation. Alternatively, as described herein, when used to pneumatically cycle the pressure level in a patient respiratory circuit 100, users can independently set the airflow rate in the patient and pneumatic circuits 100, 150.

The high or peak pressure level in the pneumatic circuit 150 may be adjusted via the optional pressure regulator 216. When the float 210 is in the buoyant second position, the inner sleeve 402 of the float 210 is positioned to occlude the proximal holes 203 in the central pipe 202. With the proximal holes 203 occluded, gas is retained within the central pipe 202 (unable to escape from the vent holes 203) and the pressure delivered in the respiratory conduit rises to the higher, peak pressure level. If the central pipe 202 has distal holes 205 and is connected to a pressure regulator, this results in the water meniscus level in the central pipe 202 dropping below the proximal vent holes 203 by a distance corresponding to the pressure regulator setting. This higher, peak pressure level is adjustable (at the pressure regulator 216) within the limits of the length of the central pipe 202. As illustrated in FIGS. 2 and 3, the distal vent holes 205 in the central pipe 202 are configured to limit the maximum peak gas pressure that can be achieved, regardless of the pressure regulator setting (this is contingent on the distal vent holes 205 having a sufficient cross sectional area to prevent a resistive effect, in which all the pressure of the system is not fully released through these holes). That is, if the regulator pop-off pressure is set so high that the air-water meniscus layer lowers down to the distal vent holes 205, the gas in the central pipe 202 will escape out the distal vent holes 205, and the peak pressure is unlikely to exceed the maximum defined by the distance between the distal vent holes 205 and the upper surface of the water column. For example, the distal holes 205 may be set to an exemplary depth of 25 cm, which would limit the maximum possible peak pressure level to 25 cm H₂O, even if the regulator 216 is capable of achieving higher pressure levels of 26 cm H₂O or more.

The optional pressure regulator 216 is configured to vary the peak pressure in the pneumatic circuit 150. In one exemplary embodiment, the pressure regulator 216 is an adjustable pop-off valve that releases the pressure above an adjustable set point, to prevent the peak pressure level from exceeding the set point (e.g., a setting of 8-25 cm). As the peak pressure level is adjusted, if there are distal holes 205 in the central pipe 202, an air-water meniscus level in the central pipe 202 will be adjusted accordingly. This meniscus can provide a mechanism for dynamic visualization of delivered pressure in the pneumatic circuit 150: users can visualize the transition from low pressure to high pressure, the high-pressure level and the transition from high pressure to low pressure. The higher the peak pressure level, the lower the air-water meniscus level will be in the central pipe 202. When the peak pressure level is such that the air-water meniscus level is below the distal holes 205 (that is, below an exemplary 25 cm), air bubbles will escape from the distal vent holes 205 and the peak pressure will be prevented from going any higher. The distal vent holes 205 can be incorporated in a modified anchor 214 instead of in the central pipe 202 for similar function.

Optionally, the distal vent holes 205 are omitted from the central pipe 202. This design can be produced much more compactly as the higher level of pressure in the pneumatic circuit 150 is no longer determined hydrostatically by the height of the water column. A manometer can be connected with the pneumatic circuit 150 to indicate the delivered pressure in the pneumatic circuit 150. A manometer can be connected with the patient respiratory circuit 100 to indicate visually the delivered pressure in the patient respiratory circuit 100. The patient respiratory circuit 100 may also be fitted with a separate safety system designed to release pressure if it exceeds a set threshold.

Optionally, the pressure regulator 216 may be omitted from the bubbling pneumatic cycler 200. In this case, the resulting high-pressure level is the result of many factors such as the airflow rate in and the volume and compliance of the pneumatic circuit 150. This pressure level in the pneumatic circuit 150 should be sufficiently high enough to obstruct the passageway of gas in the patient respiratory circuit 100 out of the low-pressure pathway 109 and instead redirect this gas out through the high-pressure pathway 107.

As noted herein, exemplary embodiments provide for adjustments and control of a dual pressure waveform in the patient respiratory circuit 100 through a pneumatic control circuit, such that a baseline pressure level and peak pressure level in the patient respiratory circuit 100 is easily set. Such embodiments allow for a simple solution that uses available distilled water, and an available compressed air source (such as providing 40 L/min of air). Once the pneumatic circuit 150 has been assembled as discussed herein and pneumatically coupled to the patient respiratory circuit 100, the patient interface 105 is connected to the patient. At this point, the air flow rate in the patient respiratory circuit 100 at the air supply 101 is set to a flow rate for a desired tidal volume and to prevent flow starvation and the air flow rate in the pneumatic circuit 150 is set for a desired cycling rate (e.g., 20-40 cycles per minute). The peak pressure level is set by selecting a pressure set point on the high-pressure regulator 108, and the low-pressure level is set by selecting a pressure set point on the low-pressure regulator 110. The pressure levels may be visually confirmed through an attached pressure monitoring system. Thereafter, the high- and low-pressure levels of the respiratory device 10 are adjusted via the respective pressure regulators 108 and 110.

The system has hitherto been described as using a single pneumatic circuit 150 and a single patient respiratory circuit 100. However, various combinations of each could be used. For example, multiple bubbling pneumatic cyclers could be used to alternately obstruct and release multiple pressure regulators in a single patient respiratory circuit 100 to generate complex multi-level pressure waveforms. Alternatively, a single pneumatic circuit 150 could be utilized to cycle the pressure in several separate patient respiratory circuits 100; these patient respiratory circuits 100 could each have different flow rates and pressures, but they would share the timing of pressure cycling.

In this description, noninvasive mechanisms for delivering dual-pressure respiratory assistance have been emphasized. However, if an endotracheal tube is used instead of nasal prongs or a mask, invasive ventilation could be developed. In this scenario, additional patient alarms could be added for patient safety. Such alarms might include a high-pressure alarm and a circuit disconnect alarm among others.

Note that there may be other applications for the mechanism of pneumatically cycling pressures described herein beyond the treatment of respiratory distress. Of particular benefit is the fact that a small flow can control a much larger flow. Also, instead of gases, fluids could potentially be cycled with a similar mechanism.

Thus, the exemplary respiratory assistance device is relatively simple and inexpensive and can be assembled, operated, disassembled, and cleaned with basic instruction and materials more easily than a traditional NIPPV device, particularly in resource-limited settings or during pandemics when there is a shortage of staff with extensive discipline-specific training. The exemplary system can be operated without electricity provided that a source of pressurized breathing gas, such as medical air and oxygen, is available. Thus, the exemplary respiratory assistance device can be operated to aid breathing in environments with little or no electrical power or other resources available, by persons without advanced discipline-specific training. Additionally, a simple, mass producible, non-electric device to provide NIPPV respiratory support for patients during a pandemic could be helpful in any setting.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A respiratory delivery system providing a bi-level pressure level airflow, the respiratory delivery system comprising:
    a gas supply and a patient interface, wherein the gas supply is coupled to the patient interface via a first conduit; and
    a low-pressure regulator and a high-pressure regulator, wherein the patient interface is coupled to both regulators via a second conduit; and
    a pneumatic cycler comprising a variable buoyancy float; wherein the pneumatic cycler is configured to alternately
        allow a release of gas through the low-pressure regulator, and wherein a low pressure is maintained, or to
        obstruct the release of gas through the low-pressure regulator, causing a release of gas through the high-pressure regulator, wherein a high-pressure level is maintained.

2. The respiratory delivery system of claim 1, wherein a pneumatic coupler comprises an occlusion device fluidly coupled to the pneumatic cycler, wherein the occlusion device is configured to obstruct the passage of gas out of the low-pressure regulator, and wherein the occlusion device is one of a diaphragm or a balloon.

3. The respiratory delivery system of claim 2, wherein the pneumatic cycler utilizes the cyclic movement of the variable buoyancy float.

4. The respiratory delivery system of claim 3, wherein a source of pneumatic gas is fluidly coupled to the pneumatic cycler.

5. The respiratory delivery system of claim 4, wherein the pneumatic cycler is a bubbling pneumatic cycler comprising:
 a container configured to support a volume of liquid;
 a pipe disposed in the container and configured to be at least partially submerged into the volume of liquid, wherein the pipe is configured to receive a flow of pneumatic gas from the pneumatic gas source; and
 an oscillatory relief valve mechanism positioned along the pipe, wherein the oscillatory relief valve comprises the variable buoyancy float configured to capture gas bubbles released through at least one first vent opening in the pipe when the float is in a lower position along the pipe; wherein the variable buoyancy float is configured to rise through the volume of liquid to an upper position above the lower position when a collection of the gas bubbles increases the buoyancy of the variable buoyancy float, wherein the variable buoyancy float is configured to release the collection of gas bubbles when the variable buoyancy float is in the upper position, and wherein the variable buoyancy float is configured to convert a constant airflow of the pneumatic gas received by the pipe into a pneumatic bi-level pressure airflow.

6. The respiratory delivery system of claim 5, wherein the pneumatic bi-level pressure airflow produced by the bubbling pneumatic cycler is used to cyclically obstruct and release the passage of gas through the low-pressure regulator.

7. The respiratory delivery system of claim 6, wherein when the float is positioned at the lower position along the pipe, the pressure level of the pneumatic bi-level pressure airflow is at a low-pressure level, and wherein the low-pressure level of the pneumatic bi-level pressure airflow deflates the occlusion device and allows gas to pass through the low-pressure regulator.

8. The respiratory delivery system of claim 6, wherein when the float is positioned at the upper position along the pipe, the pressure level of the pneumatic bi-level pressure airflow is at the high-pressure level, and wherein the high-pressure level of the pneumatic bi-level pressure air flow inflates the occlusion device and obstructs gas from passing through the low-pressure regulator, such that the gas will pass through the high-pressure regulator.

9. The respiratory delivery system of claim 4, wherein the pneumatic cycler is configured to cyclically transition the bi-level pressure airflow 10-40 cycles/minute, and wherein the cycling rate is defined by a selected flow rate of the pneumatic gas source.

10. The respiratory delivery system of claim 1 further comprising a humidification system configured to provide a selected humidity level and a selected temperature level, wherein the first conduit is also coupled to the humidification system.

11. The respiratory delivery system of claim 1, wherein the low-pressure is a baseline pressure level of 5-15 cm $H_2O$ and the high-pressure level is a peak pressure level of 10-30 cm $H_2O$.

12. A respiratory delivery system providing a bi-level pressure airflow, the respiratory delivery system comprising:
 a respiratory circuit comprising:
  a respiratory gas supply and a patient interface, wherein the respiratory gas supply is configured to supply a respiratory gas airflow to the patient interface, and wherein the respiratory gas supply is coupled to the patient interface via a first respiratory conduit; and
  a low-pressure regulator and a high-pressure regulator, wherein the patient interface is coupled to both regulators via a second respiratory conduit, wherein the low-pressure regulator and the high-pressure regulator are configured to determine a pressure level of the respiratory gas airflow passing through the low-pressure regulator and the high-pressure regulator between a low-pressure level and a high-pressure level; and
 a pneumatic circuit comprising a pneumatic cycler comprising a variable buoyancy float which is configured to cycle the pressure of a pneumatic gas airflow in the pneumatic circuit, wherein because the pneumatic circuit is coupled to the respiratory circuit via a pneumatic conduit, the pneumatic cycler is configured to cyclically alternate the pressure level of the respiratory gas airflow in the respiratory circuit between the low-pressure level and the high-pressure level as defined by the cycling pressure level of the pneumatic gas airflow.

13. The respiratory delivery system of claim 12, wherein the pneumatic circuit comprises a pneumatic gas supply configured to supply the pneumatic gas airflow to the pneumatic cycler via a coupling conduit, and wherein the pneumatic circuit supplies the pneumatic gas airflow to the bi-level pressure regulator via the pneumatic conduit.

14. The respiratory delivery system of claim 13, wherein the respiratory gas airflow supplies a larger quantity of gas than the pneumatic gas airflow.

15. The respiratory delivery system of claim 12, wherein the pressure level of the respiratory gas airflow is at the low-pressure level when the pressure level of the pneumatic gas airflow is at a low-pressure level, and wherein the pressure level of the respiratory gas airflow is at the high-pressure level when the pressure level of the pneumatic gas airflow is at a high-pressure level.

16. The respiratory delivery system of claim 12, wherein the low-pressure pressure regulator comprises an occlusion device configured to control the cycling of the pressure level of the respiratory gas airflow between the low-pressure level and the high-pressure level.

17. The respiratory delivery system of claim 16, wherein the low-pressure level of the respiratory gas airflow is maintained when the respiratory gas airflow is released through the low-pressure regulator, and wherein the high-pressure level of the respiratory gas airflow is maintained when the low-pressure regulator is obstructed by the occlusion device and the respiratory gas airflow is released through the high-pressure regulator.

18. The respiratory delivery system of claim 12, wherein the respiratory circuit comprises a humidification system configured to provide a selected humidity level to the respiratory gas airflow, and a selected temperature level to the respiratory gas airflow, and wherein the first respiratory conduit is also coupled to the humidification system.

* * * * *

UNITED STATES PATENT AND TRADEMARK OFFICE
CERTIFICATE OF CORRECTION

PATENT NO. : 12,491,331 B2  
APPLICATION NO. : 17/731320  
DATED : December 9, 2025  
INVENTOR(S) : Stephen John Page 1 of 1

It is certified that error appears in the above-identified patent and that said Letters Patent is hereby corrected as shown below:

In the Claims
Claim 12, Line 34, delete "level" after "pressure"

Signed and Sealed this
Tenth Day of February, 2026

John A. Squires
*Director of the United States Patent and Trademark Office*